United States Patent [19]

Takagi

[11] Patent Number: 5,343,604
[45] Date of Patent: Sep. 6, 1994

[54] COMBINED WORKING MACHINE

[75] Inventor: Nobuyuki Takagi, Aichi, Japan

[73] Assignee: Okuma Corporation, Nagoya, Japan

[21] Appl. No.: 57,702

[22] Filed: May 4, 1993

[30] Foreign Application Priority Data

May 13, 1992 [JP] Japan .................. 4-146226

[51] Int. Cl.⁵ .................. B23B 11/00; B23P 23/02
[52] U.S. Cl. .................. 29/27 C; 82/121; 82/129; 82/138
[58] Field of Search .................. 29/27 C, 27 R, 40, 39, 29/36; 483/24; 82/133, 134, 138, 159, 121, 129, 137; 409/240

[56] References Cited

U.S. PATENT DOCUMENTS

| | | | |
|---|---|---|---|
| 4,635,340 | 1/1987 | Link | 409/132 |
| 5,214,829 | 6/1993 | Minagawa | 29/27 C |

FOREIGN PATENT DOCUMENTS

| | | |
|---|---|---|
| 59-40961 | 11/1984 | Japan . |
| 61-3601 | 2/1986 | Japan . |
| 0131803 | 6/1986 | Japan ...................... 82/132 |
| 131361 | 9/1989 | Japan . |

*Primary Examiner*—Z. R. Bilinsky
*Attorney, Agent, or Firm*—Spensley Horn Jubas & Lubitz

[57] ABSTRACT

In a combined working machine, a positional relationship between a machining position of a workpiece and a tool can be determined to an optional value by a combination of a slide amount of a carriage along a slant surface, a slide amount of a tool post along another slant surface, a pivot amount of a turret, and a rotational amount of a chuck of a headstock. That is, the tool of the tool post can be brought into contact with the workpiece from a slant direction, and a combined working including cutting by a cutting tool and drilling in a slant direction by a drill can be performed. Further, the tool of the tool post can be moved to the desired machining position of the workpiece from the slant direction, and thus the moving amount of the tool post in a vertical direction can be reduced to lower a height of a machine tool and to give stabilization thereto.

8 Claims, 4 Drawing Sheets

COMBINED WORKING MACHINE

BACKGROUND OF THE INVENTION i) Field of the Invention

The present invention relates to a combined working machine for machining various types of cut on a workpiece held by a chuck of a headstock by bringing a tool of a tool post into contact with a workpiece at an appropriate position.

ii) Description of the Prior Arts

Conventionally, machine tools such as a lathe, a drilling machine or the like are special purpose machines for carrying out cutting, drilling or the like by a tool of a tool post into contact with a workpiece held by a chuck of a headstock, at a certain angle.

Further, a two spindle lathe having two headstocks arranged in parallel as a lathe for effectively performing cutting has been developed, as disclosed in Japanese Utility Model Publications No. Hei 1-31361 and No. Sho 59-40961. In the former case, as shown in FIG. 1, a bed 101 is formed with a slide surface 101a extending between both the ends of the bed 101. On this slide surface 101a, two headstocks 102A and 102B are installed in the central part and two saddles 104A and 104B having respective turret tool posts 103A and 103B are movably and locatably mounted on both the sides of the turret tool posts 103A and 103B. In this lathe, different cutting operations or the same cutting operation can be executed at the same time to reduce the machining time.

In the latter case, as shown in FIGS. 2 and 3, a carriage 105 or 106 is movably and locatably mounted so as to move toward two workpieces, WA and WB held by two spindle chucks and to be movable in the direction of the workpiece rotation. On the carriage 105, two turret tool posts 107A and 107B are mounted, and on the carriage 106, two tool posts 108A and 108B are mounted. Hence, by moving the carriage 105 or 106, the turret tool posts 107A and 107B or the two tool posts 108A and 108B are simultaneously moved to perform the cutting of the two workpieces WA and WB at the same time.

Further, another conventional two spindle lathe has been proposed, as disclosed in Japanese Patent Publication No. Sho 61-3601. In this case, as shown in FIG. 4, a third turret tool post 110 capable of corresponding to both main spindles 109A and 109B is provided between first and second turret tool posts 111 and 112 directing to the main spindles 109A and 109B. By providing the third turret tool post 110, two kinds of machining can be applied to one workpiece at the same time. For example, by using two tools which are attached to the turret tool posts 110 and 111 and are set to different depths of cutting loads, two cutting operation with different chip loads, which are usually machined by two steps, can be carried out on the workpiece held by a chuck of the main spindle 109A at the same time.

However, the conventional machine tool is a machine for exclusive cutting by using a fixed tool or for drilling by using a rotary tool such as a drill. Also, in the conventional lathe, in addition to cutting, drilling along a rotational axis of a workpiece can be performed, but offset drilling for drilling a bore in an offset position from the rotational axis of the workpiece can not be machined. Thus, when a combined machining operation such as cutting and offset drilling is required on one workpiece, after the workpiece is machined according to the first operation by a first machine tool, the workpiece is detached from the chuck of the first machine tool and is chucked to a second machine tool to be machined according to the second operation. Hence, in this case, combined working can not be effectively machined.

In the conventional lathe, although two turret tool posts each include a two-dimensional moving mechanism, it is conceivable to add another moving mechanism in the vertical direction so as to move the turret tool post in the three-dimensional space when the combined machining is executed. However, in this case, when the offset drilling is performed, the drilling direction is only the horizontal direction. Therefore, the turret tool post must be moved from the vertical direction to the horizontal position for carrying out the offset drilling. That is, the vertical travel distance of the turret tool post becomes long and the height of the machine tool becomes tall so that the stability of the machine tool deteriorates.

SUMMARY OF THE INVENTION

It is therefore an object of the present invention to provide a combined working machine in view of the above-described problems of the prior art, which is capable of performing combined machining with high efficiency and which is low in height with good stability.

In order to achieve this object, according to the present invention, in a combined working machine for machining a workpiece by bringing a tool held by a chuck rotatably and detachably mounted on a headstock into contact with the workpiece, a mechanism for bringing the tool into contact with the workpiece, comprises: a bed providing with the headstock on an upper surface of the bed and a first slant surface having an up slope directing to the workpiece held by the chuck; a first guide rail provided on the first slant surface, extending in a direction of a rotational axis of the workpiece; a saddle guided by and slidably mounted on the first guide rail to move in the direction of the rotational axis of the workpiece, the saddle having a second guide rail extending in a slope direction of the first slant surface of the bed; first drive means for sliding the saddle along the first guide rail; a carriage guided by the second guide rail to slide in the slope direction of the first slant surface, the carriage having a second slant surface having a down slope directing to the workpiece; a third guide rail provided on the second slant surface, extending in a slope direction of the second slant surface; second drive means for sliding the carriage along the second guide rail; a tool post, for holding the tool, guided by the third guide rail to slide in the slope direction of the second slant surface so as to bring the tool into contact with the workpiece held by the chuck at a proper position; third drive means for sliding the tool post along the third guide rail; and a turret for holding a plurality of tools, which is pivotally mounted on the tool post so as to index the tools to predetermined positions.

In the combined working machine of the present invention, by using the saddle for sliding on the first slant surface having the up slope directing to the workpiece in the direction of of the rotational axis of the work, the carriage mounted on the saddle for sliding along the first slant surface so as to move in close to the workpiece, and the tool rest movably mounted on the second slant surface provided on the carriage and having the down slope directing to the workpiece for sliding along the second slant surface so as to move in close to the workpiece, the tool of the tool post can be freely moved within a three-dimensional space with respect to the workpiece so as to be brought into contact with the workpiece. Also, the tool can be directed to the workpiece at the desired angle by the turret.

Hence, the tool of the tool post can be brought into contact with any position of the workpiece at the desired angle, and the combined working including cutting and offset drilling or the like can be effectively performed without resetting the workpiece.

Further, a positional relationship between a machining position of the workpiece and the tool (drill) can be determined to an optional value by a combination of a slide amount of the carriage along a slant surface, a slide amount of the tool post along another slant surface, a pivot amount of the turret, and a rotational amount of the chuck of the headstock. That is, the tool of the tool post can be brought into contact with the workpiece from a slant direction, and thus the workpiece can be drilled in an up or down slant direction by a drill. Hence, when the tool of the tool post is moved to the desired machining position of the workpiece, the moving amount of the tool post in a vertical direction can be reduced and a height of a machine tool can be lowered to give stabilization thereto.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
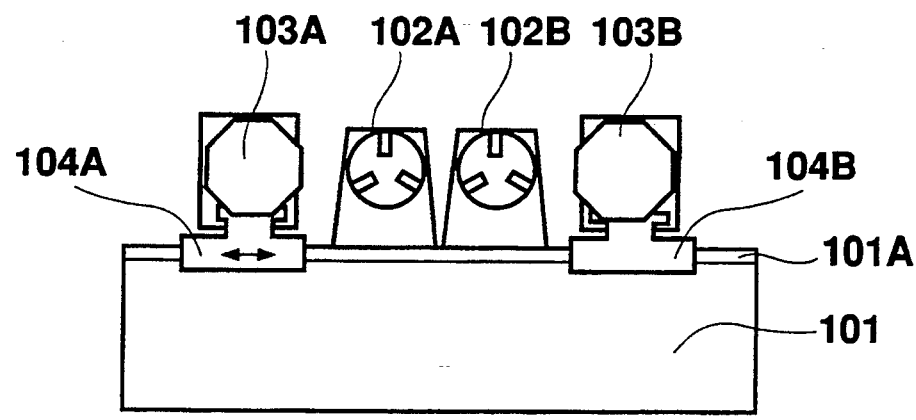
FIG. 1 is an elevational view of a conventional horizontal parallel two spindle lathe.
Figure 2:
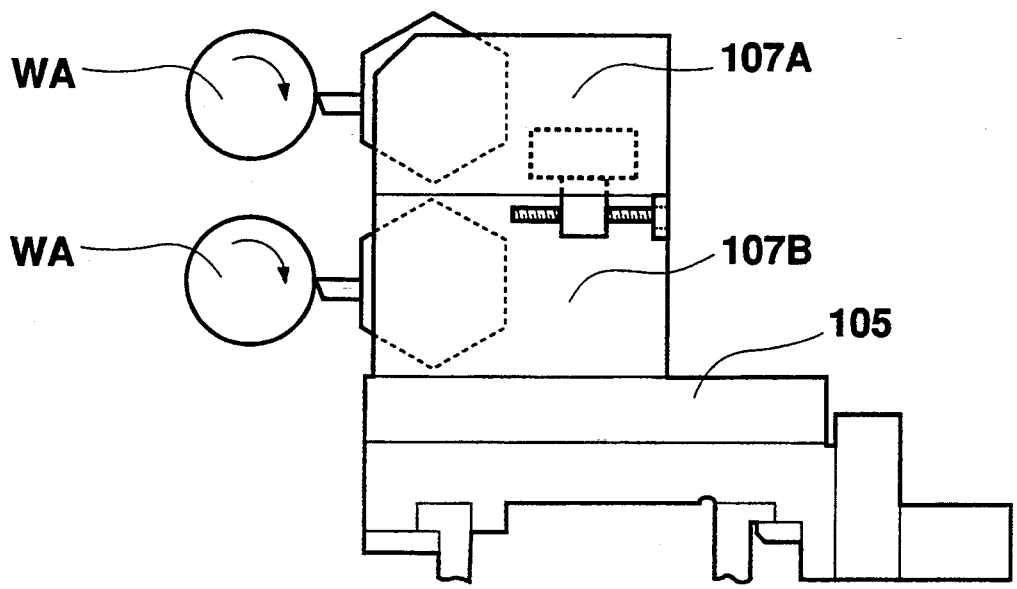
FIG. 2 is an elevational view of a conventional vertical parallel two spindle lathe.
Figure 3:
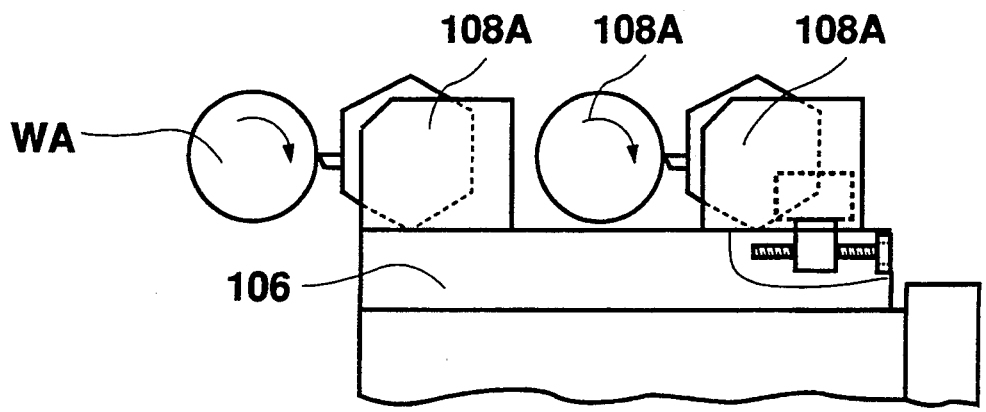
FIG. 3 is an elevational view off another conventional horizontal parallel two spindle lathe.
Figure 4:
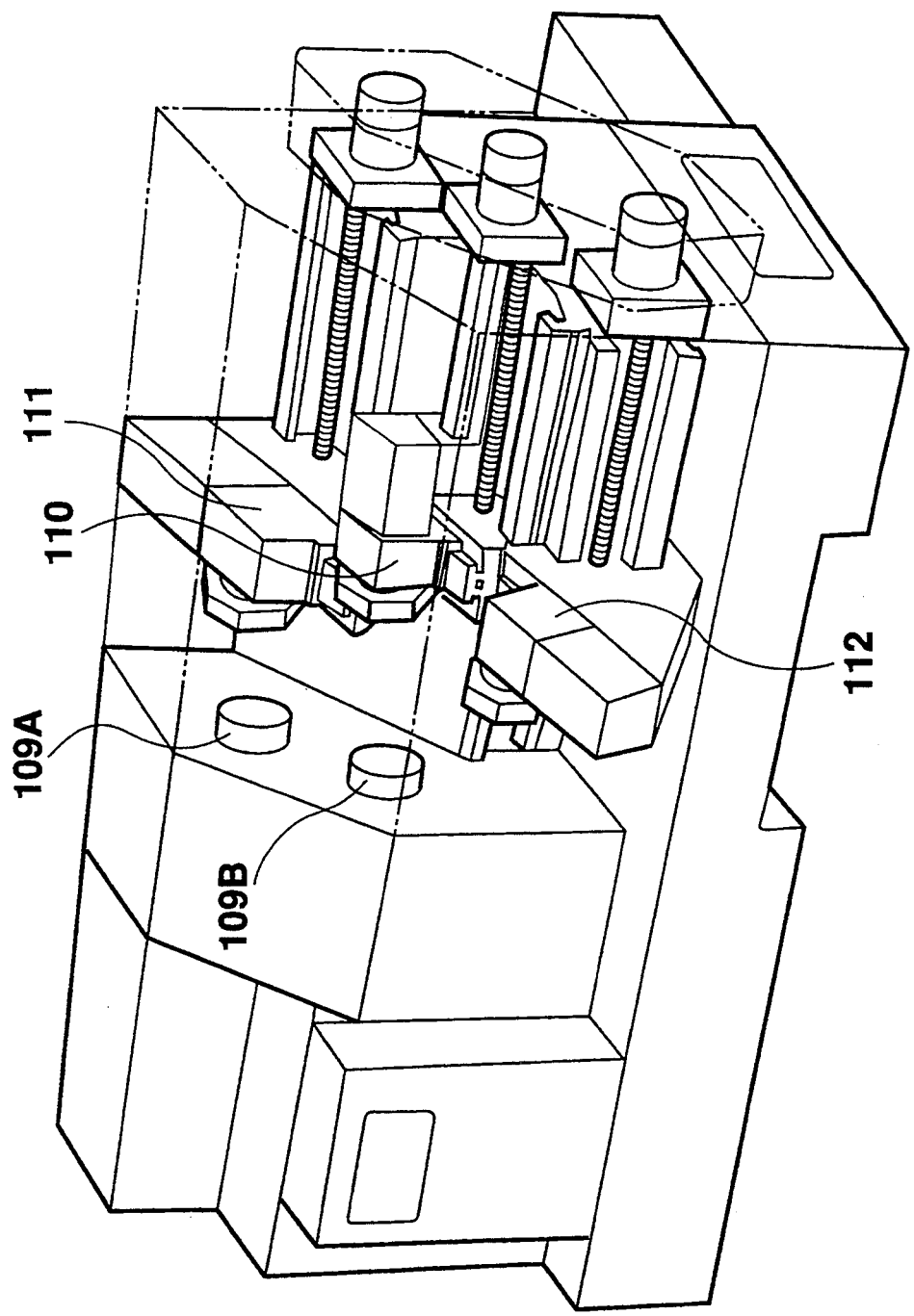
FIG. 4 is a perspective view of a conventional parallel two spindle lathe having a third turret tool post.
Figure 5:
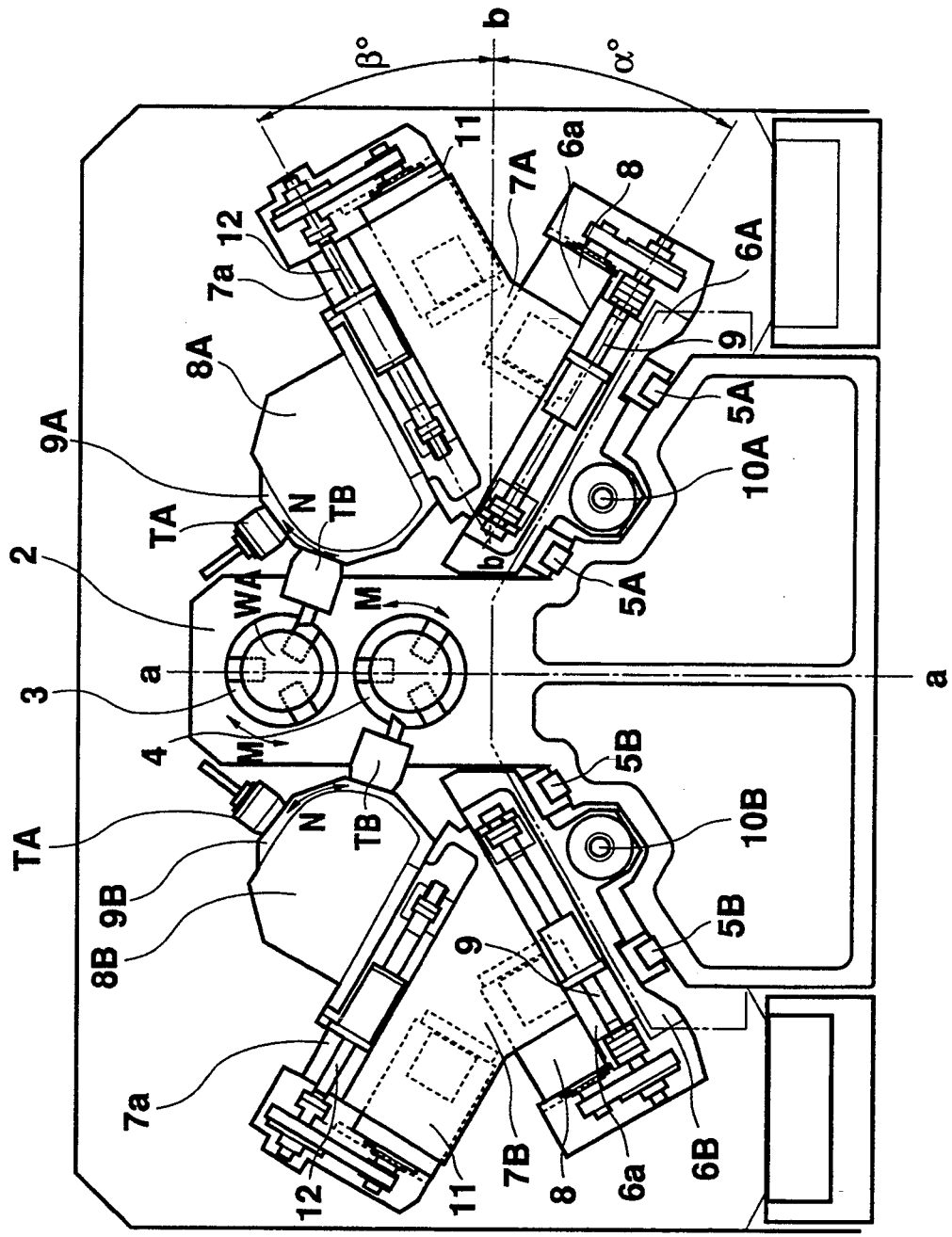
FIG. 5 is an elevational view off one embodiment of a combined working machine according to the present invention.

Referring now to the drawings, wherein like reference characters designate like or corresponding parts throughout the views and thus the repeated description thereof can be omitted for brevity, there is shown in FIG. 5 one embodiment of a combined working machine according to the present invention, having two chucks of two main spindles arranged vertically and two tool posts positioned on both sides of the two chucks.

As shown in FIG. 5, the combined working machine is provided with a headstock 2 secured in the central part of a bed 1 and two main spindles arranged vertically are mounted to the headstock 2 so as to rotate in clockwise and counter-clockwise directions by means of a plurality of bearings (not shown), as indicated by arrows M. These main spindles can be stopped and fixed at any position. Two chucks 3 and 4 for holding workpieces WA and WB are attached to the ends of the main spindles. To the bed 1, a pair of first guide rails 5A and 5B extending in parallel with the rotational axes of the workpieces WA and WB are symmetrically mounted on both sides of a vertical plane a—a including the two axes of the main spindles. The first guide rails 5A and 5B are provided on first slant planes inclined at an upward angle of a degrees with respect to a horizontal plane b—b perpendicular to the vertical plane a—a.

On these first guide rails 5A and 5B, a pair of saddles 6A and 6B are movably mounted so as to travel in the directions of the rotational axes of the workpieces WA and WB. The saddles 6A and 6B are moved and positioned by means of first drive means composed of servo motors (not shown) and ball screws 10A and 10B. The saddles 6A and 6B are formed with second guide rails 6a having the upward angle of α degrees on the upper surfaces. On the second guide rails 6a, a pair of carriages 7A and 7B are movably mounted so as to move in the directions of the inclinations of the bed 1. The carriages 7A and 7B are moved and positioned by means of second drive means composed of servo motors 8 and ball screws 9 secured to the saddles 6A and 6B.

The carriages 7A and 7B are provided with third guide rails 7a on second slant planes inclined at a downward angle of β degrees facing the vertical plane a—a with respect to the horizontal plane b—b. On these third guide rails 7a, a pair of tool posts 8A and 8B are movably mounted so as to move in the directions of the second slant planes of the carriages 7A and 7B. The tool posts 8A and 8B are moved and positioned by means of third drive means composed of servo motors 11 and ball screws 12 secured to the carriages 7A and 7B. The tool posts 8A and 8B are formed with turrets 9A and 9B which are pivotal in the directions indicated by arrows N. A drill TA as a rotary tool and a cutting tool TB as a fixed tool are mounted to a tool mount station of each turret 9A or 9B. The drill TA and the cutting tool TB, as shown in FIG. 6, are adapted to index to first, second and third tool positions A, B and C directed towards the chuck 4, an intermediate position between the chucks 3 and 4, and the chuck 3, respectively.

Figure 6:
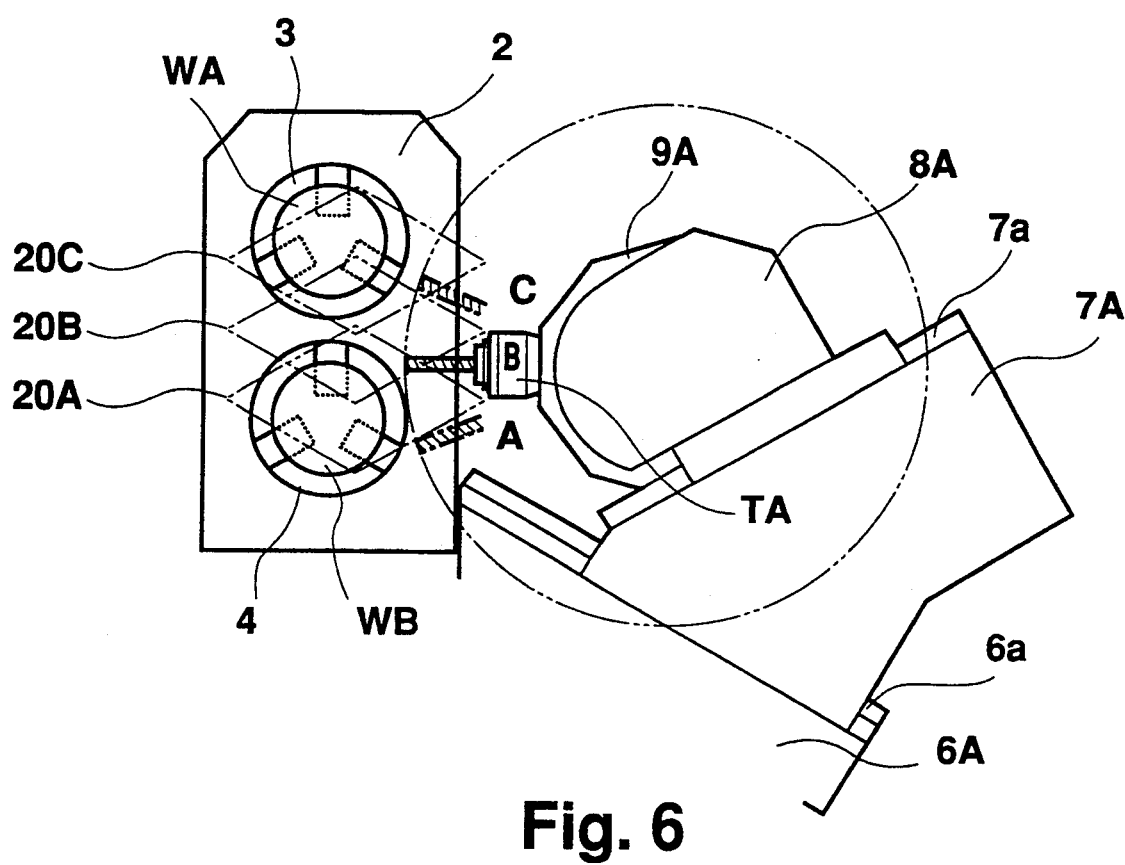
FIG. 6 is an explanatory view off a main spindle and a turret tool post part for showing one embodiment of an indexing position of a tool attached to the turret tool post shown in FIG. 5.

For example, as shown in FIG. 6, after the drill TA is moved to the first tool position A by pivoting the turret 9A, the drill TA can be moved in an optional direction by sliding the carriage 7A along the second guide rail 6a and the tool post 8A along the third guide rail 7a. That is, when the drill TA is positioned in the first tool position A, the drill TA can be freely moved within a rhombic range 20A indicated by a broken line in FIG. 6. Hence, the drill TA can be brought into contact with the workpiece WA from an inclined direction and the workpiece WA can be drilled in the upward or downward slant direction by the drill TA.

In this embodiment, as described above, it is not necessary to move the drill TA to a horizontal position with respect to an offset drilling position of the workpiece and the travel distance of the turret 9A in the vertical direction can be reduced.

Next, the operation of the combined working machine described above will now be described.

In this working operation, the workpiece WB to be machined by a first process of combined working is held by the lower chuck 4 and the workpiece WA which has already been machined by the first process and to be machined by a second process of the combined working is held by the upper chuck 3.

First, in the first machining process, the cutting tool TB of the left hand side turret 9B shown in FIG. 5 is indexed to the symmetric position to the first tool position A shown in FIG. 6 and the machining is executed by sliding the saddle 6B and the tool post 8B or by sliding a combination of the carriage 7B and the tool post 8B and sliding the saddle 6B. Next, the drill TA of the turret 9B is indexed to the symmetric position to the first tool position A or the second tool position B shown in FIG. 6 and the offset drilling or the like is performed by sliding a combination of the carriage 7B and the tool post 8B or by sliding only the tool post 8B.

Next, in the second machining process executed at the same time as the first machining process, first, the cutting tool TB of the right hand side turret 9A shown in FIG. 5 is indexed to the third tool position C shown in FIG. 6 and the machining is carried out by sliding the carriage 7A and the saddle 6A or by sliding a combination of the carriage 7A and the tool post 8A and sliding the saddle 6A. Next, the drill TA of the turret 9A is indexed to the second tool position B or the third tool position C shown in FIG. 6 and the offset drilling or the like is executed by sliding a combination of the carriage 7A and the tool post 8A or by sliding only the tool post 8A.

Figure 7:
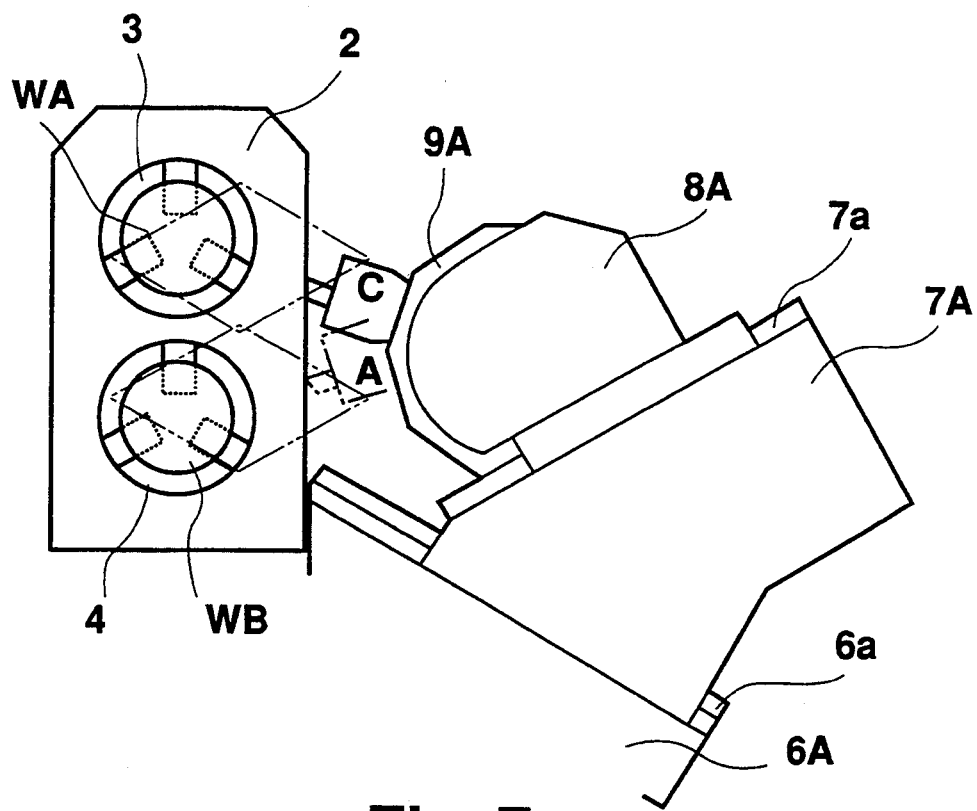
FIG. 7 is an explanatory view of a main spindle and a turret tool post part for showing another embodiment of an indexing position of a tool attached to the turret tool post shown in FIG. 5.

When a large machining time difference between the first and second processes is caused, the simultaneous machinings are applied to one workpiece from both sides depending on the necessity of shortening the machining time. Also, by carrying out the attachment and detachment of the workpieces to or from the chucks 3 and 4 and the transfer of the workpieces between the chucks 3 and 4 by means of a robot or the like, effective machinings can be performed. The indexing of the turrets 9A and 9B is not restricted to the first, second and third tool positions A, B and C, and, of course, the turrets 9A and 9B can be indexed to only the first tool position A and the third tool position C, as shown in FIG. 7. In this case, it is readily understood that the operation is carried out in the same manner as described above except for the second tool position B.

As described above, according to the present invention, in a combined working machine, by using slide mechanisms provided on slant surfaces, a tool can be brought into contact with any position of a workpiece. Hence, a combined working composed of cutting by a fixed tool and machining by a rotary tool can be effectively performed. Also, since the tool can be brought into contact with the workpiece from a slant direction, even when offset drilling of the workpiece is carried out, a vertical moving amount given to a tool post for holding the tool can be reduced. Therefore, the height of the machine can be lowered and miniaturization and stabilization of the machine can be achieved.

Further, in the above-described preferred embodiments, although the two main spindles are arranged vertically, the present invention is not restricted to the embodiments and, of course, only one or more than two main spindles can be used. Furthermore, although the tool post moving mechanisms are arranged on both sides of the main spindles, of course, the moving mechanisms can be arranged on one side of the main spindles.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. In a combined working machine for machining a workpiece held by a chuck rotatably and detachably mounted on a headstock by bringing a tool into contact with the workpiece, the improvement comprising a mechanism for bringing the tool into contact with the workpiece, said mechanism comprising:
   (1) a bed having an upper surface, with the headstock being disposed at the upper surface of the bed and having a first slant surface having an upward slope directed to the workpiece held by the chuck;
   (2) a first guide rail provided on the first slant surface, extending in a direction of a rotational axis of the workpiece;
   (3) a saddle guided by and slidably mounted on the first guide rail to move in the direction of the rotational axis of the workpiece, the saddle having a second guide rail extending in a slope direction of the first slant surface of the bed;
   (4) first drive means for sliding the saddle along the first guide rail;
   (5) a carriage guided by the second guide rail to slide in the slope direction of the first slant surface, the carriage having a second slant surface having a downward slope directed to the workpiece;
   (6) a third guide rail provided on the second slant surface, extending in a slope direction of the second slant surface;
   (7) second drive means for sliding the carriage along the second guide rail:
   (8) a tool post for holding the tool, guided by the third guide rail to slide in the slope direction of the second slant surface so as to bring the tool into contact with the workpiece held by the chuck at an appropriate position;
   (9) third drive means for sliding the tool post along the third guide rail; and
   (10) a turret for holding a plurality of tools, which is pivotally mounted on the tool post so as to index the tools to predetermined positions.

2. The combined working machine of claim 1, wherein the turret holds at least a rotary tool and a fixed tool.

3. The combined working machine of claim 1, wherein the headstock includes two chucks arranged in parallel in a vertical direction.

4. The combined working machine of claim 2, wherein the headstock includes two chucks arranged in parallel in a vertical direction.

5. The combined working machine of claim 1, wherein two mechanisms for bringing the tool into contact with the workpiece are symmetrically arranged on both sides of the rotational axis of the workpiece.

6. The combined working machine of claim 2, wherein two mechanisms for bringing the tool into contact with the workpiece are symmetrically arranged on both sides of the rotational axis of the workpiece.

7. The combined working machine of claim 3, wherein two mechanisms for bringing the tool into contact with the workpiece are symmetrically arranged on both sides of the rotational axis of the workpiece.

8. The combined working machine of claim 4, wherein two mechanisms for bringing the tool into contact with the workpiece are symmetrically arranged on both sides of the rotational axis of the workpiece.

* * * * *